(12) United States Patent
McKinney et al.

(10) Patent No.: US 7,995,756 B1
(45) Date of Patent: Aug. 9, 2011

(54) MOBILE DEVICE PLAYBACK AND CONTROL OF MEDIA CONTENT FROM A PERSONAL MEDIA HOST DEVICE

(75) Inventors: David Uel McKinney, Olathe, KS (US); Monika Kishor Panpaliya, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 898 days.

(21) Appl. No.: 11/248,688

(22) Filed: Oct. 12, 2005

(51) Int. Cl.
*H04K 1/00* (2006.01)
*G06F 7/04* (2006.01)

(52) U.S. Cl. ............ 380/247; 726/26; 726/27; 455/410; 713/170

(58) Field of Classification Search .......... 380/201, 380/247, 211, 212; 713/182, 155; 726/5, 726/31, 32, 27; 725/44, 106, 87, 2; 348/14.02; 714/1, 4, 8
See application file for complete search history.

(56) References Cited

U.S. PATENT DOCUMENTS

| | | | |
|---|---|---|---|
| 6,243,761 B1 * | 6/2001 | Mogul et al. ................ | 709/246 |
| 6,480,961 B2 * | 11/2002 | Rajasekharan et al. ....... | 726/27 |
| 7,660,605 B2 * | 2/2010 | Hazell et al. ................ | 455/557 |
| 2003/0131353 A1 * | 7/2003 | Blom et al. .................. | 725/25 |
| 2004/0148400 A1 * | 7/2004 | Mostafa ...................... | 709/227 |
| 2004/0243634 A1 * | 12/2004 | Levy ........................... | 707/104.1 |
| 2005/0165849 A1 * | 7/2005 | Moradi et al. ............... | 707/104.1 |
| 2005/0228897 A1 * | 10/2005 | Yamamoto et al. ........... | 709/231 |
| 2006/0095472 A1 * | 5/2006 | Krikorian et al. ........... | 707/104.1 |

FOREIGN PATENT DOCUMENTS

WO WO 2005048011 A2 * 5/2005
WO WO 2005051022 A1 * 6/2005

OTHER PUBLICATIONS en.wikipedia.org/wiki/Real_Time_Streaming_Protocol—Wikipedia.*
http://www.slingmedia.com/get/io_1157566576257.html—"Sling media Gives Consumers Their TV Anywhere Anytime" with the slingbox, Internet, Jun. 30, 2005.*

* cited by examiner

*Primary Examiner* — David J Pearson
*Assistant Examiner* — Mohammad L Rahman

(57) ABSTRACT

Mobile device playback and control of media content stored on a personal media host device is provided. The mobile device may communicate a request for media content to a network server, which may determine whether the mobile device is authorized to access the requested media content. If it is determined that the mobile device is authorized, the network server may access the media content from the host device. The network server may then initiate a media session with the mobile device, wherein the media content is streamed to the mobile device.

13 Claims, 3 Drawing Sheets

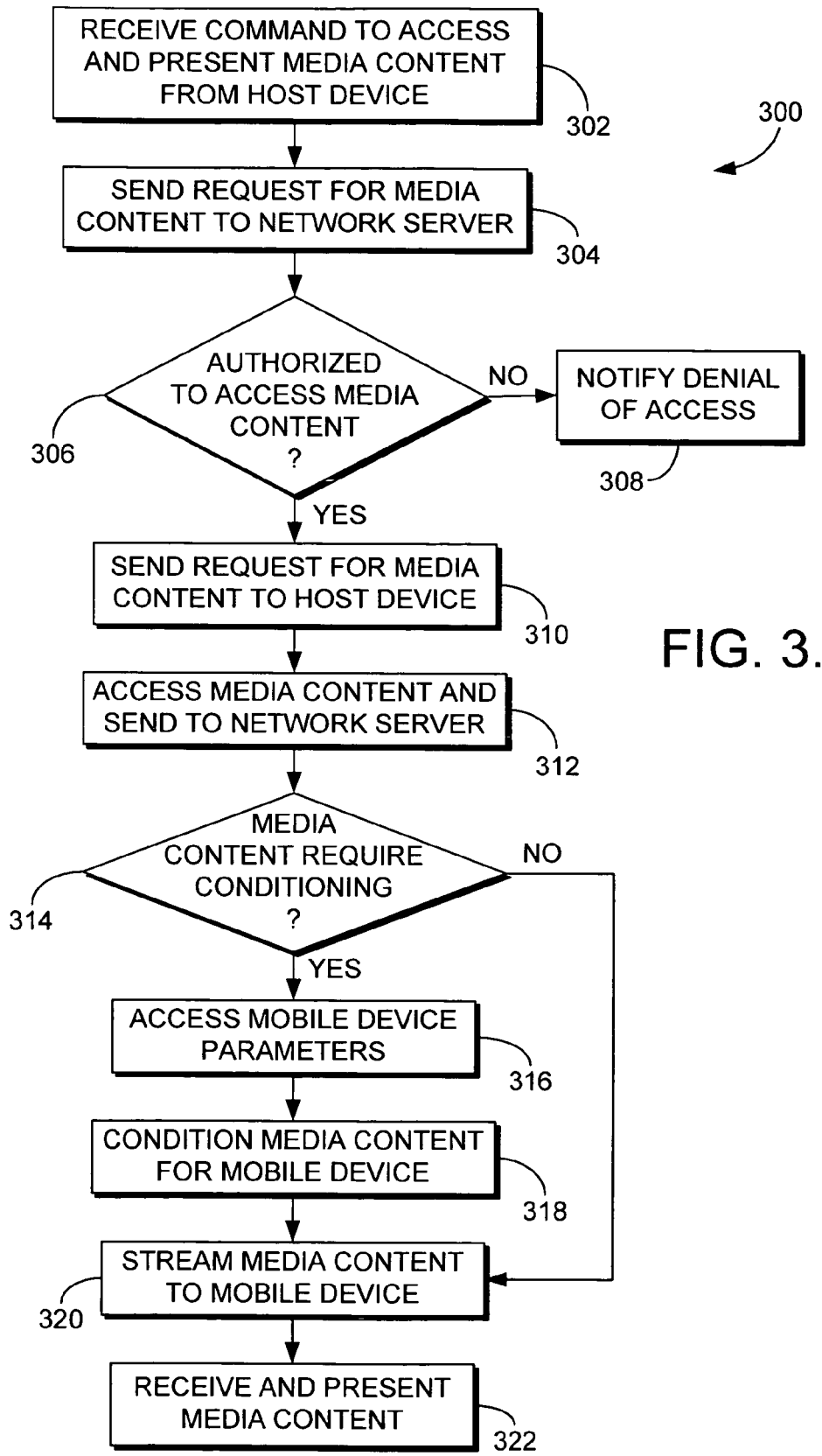

MOBILE DEVICE PLAYBACK AND CONTROL OF MEDIA CONTENT FROM A PERSONAL MEDIA HOST DEVICE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to using a mobile device to remotely playback and control media content stored on a personal media host device.

BACKGROUND

A variety of personal computing devices have been developed that allow users to store media content in digital form on hard drives or some other media. For example, user's personal home computers are often the primary place for storing and organizing all the users' media content. In addition, personal video recorders (PVRs) (or digital video recorders 'DVRs' or the like) may record content, such as television shows and movies, such that users may watch the content at a later time. However, users often maintain such devices at their premises as the devices are not typically mobile. As such, if users are away from their premises or otherwise unable to reach such devices, they will not be able to access the media content. For example, users may wish to access media content on their PVRs from a remote location, such as while waiting in line at a store or while waiting for a flight at an airport. A myriad of other examples abound in which users may wish to access media content stored on personal computing devices while located remotely. The current state of the art could be improved if users could access media content from remote locations, including mechanisms that take advantage of devices that are convenient to users while away from their premises. One such alternative mechanism could be the use of a mobile device, such as a cellular phone that normally facilitates telephone conversations.

SUMMARY

Embodiments of the present invention are directed to providing mobile device playback and control of media content stored on a personal media host device. Thus, in one aspect, an embodiment of the present invention relates to one or more computer-readable media having computer-useable instructions embodied thereon for causing one or more computing devices to perform a method. The method includes receiving, from a mobile device, a request for media content stored on a personal media host device. The method also includes determining whether the mobile device is authorized to access the media content stored on the personal media host device. The method further includes accessing the media content from the personal media host device if the mobile device is authorized to access the media content. The method still further includes initiating a streaming session with the mobile device, wherein the media content is streamed to the mobile device.

In another aspect of the invention, an exemplary embodiment is directed to a system for providing mobile device playback and control of media content stored on a personal media host device. The system includes a mobile device, a personal media host device having media content stored thereon, and one or more network servers. The one or more network servers are capable of receiving, from the mobile device, a request for media content stored on the personal media host device, determining whether the mobile device is authorized to access media content from the personal media host device, accessing the media content from the personal media host device if the mobile device is authorized, and initiating a streaming session with the mobile device, wherein the media content is streamed to the mobile device.

A further aspect of the invention takes the form of a mobile device providing playback and control of media content from a personal media host device. The mobile device includes one or more client applications for communicating, to one or more network servers, a request for media content stored on the personal media host device and for engaging in a streaming media session with the one or more network servers to receive the requested media content if the mobile device is authorized to access the media content. The request for the media content includes a unique identifier for either or both of the mobile device and the personal media host device, and the one or more network servers determine whether the mobile device is authorized to access the media content based on the unique identifier.

BRIEF DESCRIPTION OF THE SEVERAL VIEWS OF THE DRAWINGS

The present invention is described in detail below with reference to the attached drawing figures, which are incorporated by reference herein and wherein:

FIG. 3 is a flow diagram showing a method for accessing, on a mobile device, media content stored on a personal media host device in accordance with an embodiment of the present invention.

DETAILED DESCRIPTION

Figure 1:
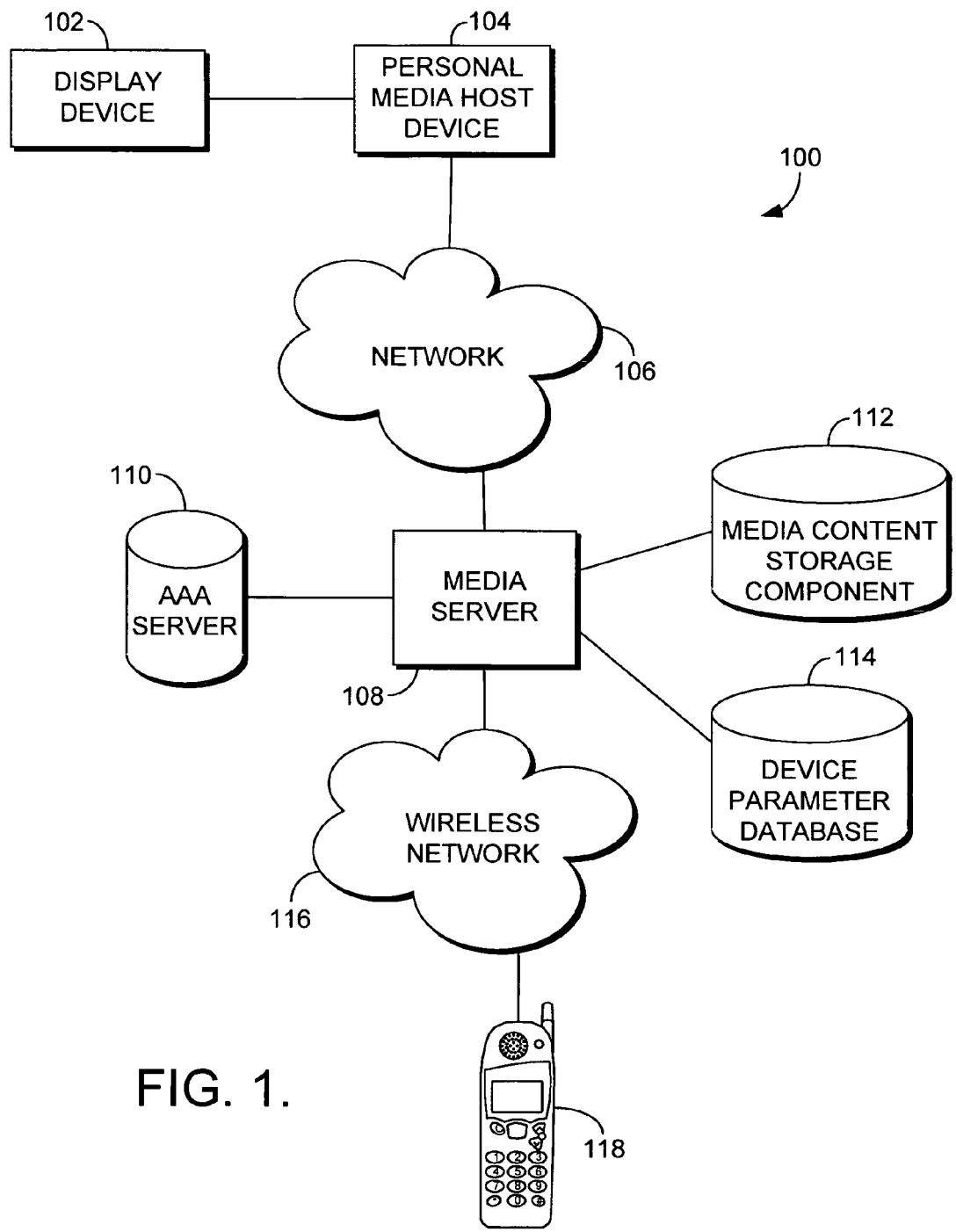
FIG. 1 is a block diagram of an exemplary system architecture suitable for use in implementing an embodiment of the present invention.

Embodiments of the present invention, among other things, provide the ability for a mobile device to access and remotely playback and control media content stored on a personal media host device. A mobile device may communicate requests for media content stored on a personal media host device to a network server, which may authenticate the mobile device and determine whether the mobile device is authorized to access the requested media content. If it is determined that the mobile device is authorized to access the requested media content, the network server accesses the media content from the personal media host device. The network server may then initiate a streaming session, in which the media content is streamed from the network server to the mobile device. In some embodiments, the network server may condition the media content for the mobile device based on the mobile device's capabilities (e.g., screen size and resolution, codec capabilities, etc.). In addition, the mobile device may issue control commands (e.g., "stop," "pause," "rewind," "fast-forward," etc.) to the network server to control the streaming session. Further, quality of service information regarding the streaming session may be provided to the network server, which may adapt the streaming session based on the quality of service information.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
A-KEY Authentication Key
BSC Base Station Controller
BTS Base Transceiver Station
DVR Digital Video Recorder
ESN Electronic Serial Number
HDR Hard Disk Recorder
HTTP Hypertext Transfer Protocol
IP Internet Protocol
MIN Mobile Identification Number
PDA Personal Data Assistant
PDSN Packet Data Serving Node
PSTN Public-Switched Telephone Network
PTR Personal TV Receiver
PVR Personal Video Recorder
PVS Personal Video Station
RADIUS Remote Authentication Dial-In User Service
RTP Real-Time Transport Protocol
RTCP Real-Time Control Protocol
RTSP Real-Time Streaming Protocol
STB Set-Top Box
UAProf User Agent Profile Further, various technical terms are used throughout this description. A definition of such terms can be found in *Newton's Telecom Dictionary* by H. Newton, 21st Edition (2005). These definitions are intended to provide a clearer understanding of the ideas disclosed herein but are in no way intended to limit the scope of the present invention.

As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media include media implemented in any method or technology for storing information. Examples of stored information include computer-useable instructions, data structures, program modules, and other data representations. Computer-storage media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 shown in FIG. 1 illustrates an exemplary system providing the capability for a mobile device 118 to remotely access media content stored on a personal media host device 104 and control playback of the accessed media content. In general, the personal media host device 104 may be any type of personal computing device having a hard drive or some other media for storage of a user's media content. For example, in some embodiments, the personal media host device 104 may be a user's personal computer, in which the user may store media content, such as home videos, movies, and the like. In some embodiments, the personal media host device 104 may be a device arranged to receive and display analog and/or digital television and other content, and which is capable of communicating data with a media-delivery network, such as a cable-television network or a satellite-television network. In such embodiments, by way of example and not limitation, the personal media host device 104 may be a set-top box (STB), a legacy box, an STB having an integrated cable modem, a digital video recorder (DVR), a personal video recorder (PVR), a hard disk recorder (HDR), a personal video station (PVS), a personal TV receiver (PTR), and/or an integrated terminal device, physically integral to, for example, a television. As shown in FIG. 1, a display device 102, which may be any type of device capable of displaying content from the personal media host device 102, may be associated with the personal media host device 104. For example, the display device 102 may be a television or monitor. In some embodiments, the personal media host device 104 and display device 102 may be incorporated into a single, integrated device.

The personal media host device 104 may include one or more client applications for communicating media content and related information in accordance with embodiments of the present invention. For example, a client application may provide the ability for the personal media host device 104 to communicate with the media server 108 via network 106. The network 106 may include one or more wide area networks (WANs) and/or one or more local area networks (LANs), as well as one or more public networks, such as the Internet, and/or one or more private networks. In embodiments in which the personal media host device 104 is a device such as a PVR communicating with a media-delivery network, the network 106 may include one or more media-delivery networks, such as a cable-television network or a satellite-television network. Packets may be routed in and among the network 106 using protocols, such as the Internet Protocol (IP), and devices in communication within and among the network 106 may be identified by a network address, such as an IP address. Further, the network 106 may be connected to and communicate with a number of circuit-switched networks (not shown), such as the public-switched telephone network (PSTN), for example.

The media server 108 may coordinate the mobile device's 118 access to media content and associated information stored on the personal media host device 104. Although the media server 108 is shown as a single component in FIG. 1, in practice, one or more network components may provide the functionality of the media server 108 as described herein. Generally, the media server 108 receives requests for media content and/or associated information from the mobile device 118. Based on such requests, the media server 108 may access and provide the requested media content and/or associated information to the mobile device 118.

The media server 108 may communicate with an authentication, authorization, and accounting (AAA) server 110, which may be used to control access to resources on the personal media host device 104. In particular, the AAA server 110 may store or be associated with databases storing information regarding the mobile device's 118 authorizations to access resources on the personal media host device 104. For example, the AAA server 110 or associated database may store information associating the mobile device 118 with the personal media host device 104 and indicating whether the mobile device 118 is authorized to access media content and associated information on the personal media host device 104. In some embodiments, communication with the AAA server may comply with the Remote Authentication Dial-In User Service (RADIUS) standard.

In operation, the media server 108 may receive, from the mobile device 118, a request for media content stored on the personal media host device 104 and may communicate with the AAA server 110 to determine whether the mobile device 118 is authorized to access the requested media content. If the mobile device 118 is authorized to access the requested media content, the media server 108 may request and receive the media content from the personal media host device 104. A media content storage component 112 may be associated with the media server 108 for temporary storage of the media content. The media server 108 may then initiate a streaming media session with the mobile device 118, thereby streaming the media content to the mobile device 118.

In some embodiments, the media server 108 may condition media content prior to streaming it to the mobile device 118. Such conditioning may be based on hardware and software characteristics of the mobile device 118. By way of example only and not limitation, the media server 108 may condition the media content based on the mobile device's 118 screen size and resolution, codec format capability, and frame per second capability. In some embodiments, the media server 108 may store static mobile device parameters in an associated device parameter database 114 for the purpose of conditioning media content for the mobile device 118. In further embodiments, the media server 108 may communicate with the mobile device 118 to access static and/or dynamic device parameters. The communication of mobile device parameters may comply with the UAProf (User Agent Profile) standard.

Communication of media content from the media server 108 to the mobile device 118 may comply with protocols, such as the real-time transport protocol (RTP), real-time streaming protocol (RTSP), and real-time control protocol (RTCP), for example. Using these or similar protocols, the mobile device 118 may control streaming of media content from the media server 108. For example, the mobile device 118 may issue such commands as "play," "stop," "pause," "rewind," "fast forward," and "frame-by-frame" viewing. In addition, statistical information regarding the streaming session, such as lost packets, may be communicated to the media server 108 for quality of service purposes. Using this information, the media server 108 may attempt to increase the quality of service by adjusting the media content stream, for example, by streaming at a lower frames per second or by using a lower compression codec.

In general, the mobile device 118 may be any type of device capable of communicating wirelessly via the wireless network 116. By way of example only and not limitation, the mobile device 118 may be a cell phone, a pager, or a personal data assistant (PDA). One or more client applications may reside on the mobile device 118 for coordinating access to resources on the personal media host device 104. For example, a client application may provide for communication with the media server 108 to request and gain authorization to access resources on the personal media host device 104. In addition, a client application may be provided for coordinating media content streaming sessions with the media server 108, including controlling the media content stream from the media server 108, via RTP, RTSP, RTCP, or other similar protocols.

To provide wireless service to the mobile device 118, the wireless network 116 may include a base transceiver station (BTS) (not shown), which provides a wireless coverage area. The BTS may communicate over a wireless air interface with one or more wireless devices, such as the mobile device 118, located in the wireless coverage area. The communication between the BTS and the mobile device 118 may occur in a digital format, such as CDMA, TDMA, GSM, 3G, or 802.11x, or may occur in an analog format, such as AMPS.

To provide mobile device 118 access to the wireless network 116, the BTS may be coupled with a base station controller (BSC) (not shown). The BTS may include a packet control function, and a packet data serving node (PDSN) (not shown) may connect the BSC to the wireless network 116. The PDSN may then act as a network access server, providing the mobile device 118 access to the wireless network 116. Alternatively or additionally, the system 100 may include other network elements for providing mobile device 118 access to the wireless network 116.

The mobile device 118 may be identified by employing any of a number of identifiers. By way of example and not limitation, the mobile device 118 may be identified using a unique Electronic Serial Number (ESN), which is typically hard-coded into the device, a unique Mobile Identification Number (MIN), which is typically assigned to the device by a telecommunications-service provider, a special authentication key (A-key), which may be used for validating the mobile device's 118 identify, and/or a predetermined username and password. In addition, the mobile device 118 may be capable of engaging in packet-data communication and may be identified by a network address, such as an IP address. The network address may be permanently assigned to the mobile device 118 or may be dynamically assigned using a number of methods, such as a Simple IP process or a Mobile IP process.

Figure 2:
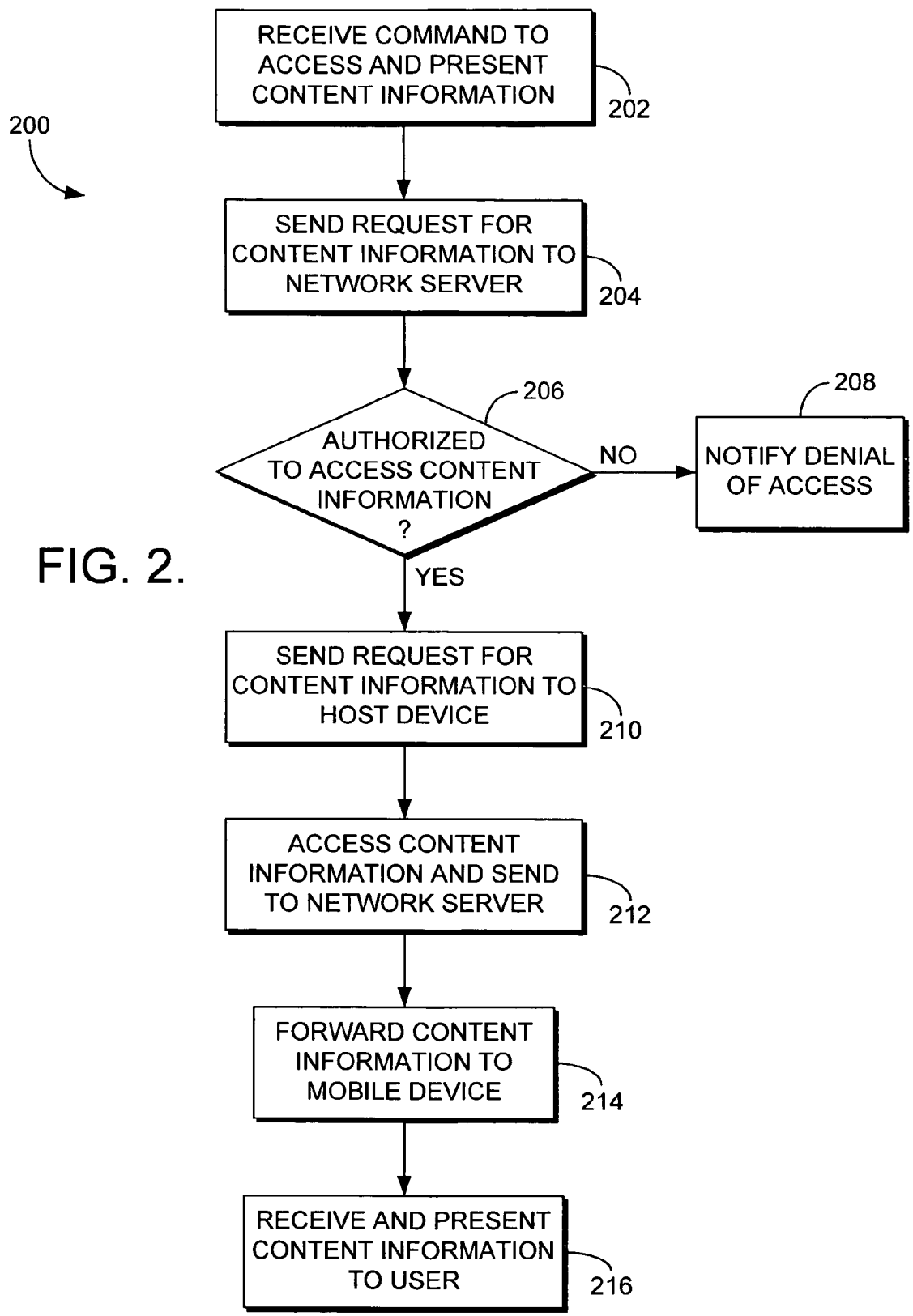
FIG. 2 is a flow diagram showing a method for accessing, on a mobile device, information regarding media content stored on a personal media host device in accordance with an embodiment of the present invention.

In accordance with embodiments of the present invention, a user may employ a mobile device, such as the mobile device 118 of FIG. 1, to remotely access content stored on an associated personal media host device, such as the personal media host device 104 of FIG. 1. Typically, prior to accessing content, a user may wish to know what content is currently stored on the personal media host device. Accordingly, referring to FIG. 2, a flow diagram is provided illustrating an exemplary method 200 for accessing, on a mobile device, information regarding media content stored on a personal media host device in accordance with embodiments of the present invention. Initially, the mobile device receives a command to access personal media host device content information, as shown at block 202. Typically, the command will be a user-initiated action, such as a user selecting a menu option on the mobile device to view information regarding the content stored on the personal media host device.

After receiving the command, the mobile device sends a request for the personal media host device content information to a network server, such as the media server 118 of FIG. 1, that may coordinate access to the personal media host device, as shown at block 204. For example, the mobile device may send an HTTP request for the information to the network server. The network server may then determine whether the mobile device is authorized to access the information regarding content on the personal media host device, as shown at block 206. For example, the network server may communicate with an AAA server, such as the AAA server 110 of FIG. 1, to determine whether the mobile device is authorized. In some embodiments, the request may include a unique identifier for both the mobile device and the personal media host device for authentication and authorization purposes. In other embodiments, the request may include an identifier for the mobile device only, and the AAA server or other component may be able to identify an associated personal media host device by querying a datastore containing information that associates the mobile device identifier with a particular personal media host device.

If it is determined that the mobile device is not authorized to access resources on the personal media host device, the mobile device is denied access and a notification of such denial of access may be provided to the mobile device, as shown at block 208. Alternatively, if it is determined that the mobile device is authorized to access resources on the personal media host device, the network server sends a request for content information to the personal media host device, as shown at block 210. The request may consist of an HTTP request for the information. In response to the request, the personal media host device accesses and provides the information to the network server, as shown at block 212. The network server may then forward the content information to the mobile device, as shown at block 214. After receiving the content information, the mobile device presents the information to the user, as shown at block 216.

After accessing the information detailing media content stored on the personal media host device, the user may review and select particular media content for viewing. Accordingly, turning now to FIG. 3, a flow diagram is shown illustrating an exemplary method 300 for accessing, on a mobile device, media content stored on a personal media host device in accordance with an embodiment of the present invention. Initially, the mobile device receives a command to access and present media content from the personal media host device, as shown at block 302. For example, after accessing information regarding the media content stored on the personal media host device, the user may provide an indication of media content the user wishes to view. Based on the selection, the mobile device sends a request for the selected media content to a network server, such as the media server 108 of FIG. 1, as shown at block 304. For example, an HTTP request for the selected media content may be communicated from the mobile device to the network server. In some embodiments, such as that shown in FIG. 3, the network server determines whether the mobile device is authorized to access the selected media content, as shown at block 306. As discussed previously with reference to FIG. 2, the network server may communicate with an AAA server for authentication and authorization purposes.

If it is determined that the mobile device is not authorized to access the selected media content, a denial of access notification may be provided to the mobile device, as shown at block 308. Alternatively, if it is determined that the mobile device is authorized to access the selected media content, the network server sends a request for the selected media content to the personal media host device, as shown at block 310. The request may consist of an HTTP request for the selected media content. In response to the request, the personal media host device accesses the selected media content and sends the media content to the network server, as shown at block 312.

In some cases, the media content may be conditioned based on specific capabilities of the requesting mobile device to provide improved presentation of the media content on that device. For example, the media content may be conditioned for the mobile device's screen size and resolution. In addition, the media content may be conditioned based on the mobile device's codec capabilities and frame per second capabilities. One skilled in the art will recognize that a variety of other types of media content conditioning may be performed within the scope of the present invention. Accordingly, after receiving the content, the network server determines whether any conditioning is necessary, as shown at block 314. If the network server determines that conditioning is unnecessary, the network server streams the media content to the mobile device, as shown at block 320. Alternatively, if the network server determines that conditioning is required, the network server may access information regarding mobile device parameters and capabilities, as shown at block 316. In some embodiments, the network server may have an associated database for storing device capabilities, such as the device parameter database 114 shown in FIG. 1. The network server may then access the information from the database. In other embodiments, the network server may dynamically access device parameter information from the mobile device. By way of example only and not limitation, embodiments of the invention may employ the UAProf (User Agent Profile) specification for communicating mobile device capabilities to the network server.

After accessing information regarding the capabilities of the mobile device, the network server conditions the media content based on the device capabilities, as shown at block 318. The network server may then begin to stream the conditioned media content to the mobile device, as shown at block 320. The mobile device may receive the streamed content and present the media content to the user, as shown at block 322.

As discussed previously, the user may employ the mobile device to control the streaming media content from the network server. For example, the streaming session between the network server and the mobile device may comply with the RTP, RTSP, and RTCP standards. Accordingly, a user may employ the mobile device to issue RTSP control commands, such as "play," "stop," "pause," "fast forward," and "rewind,"

to the network server, thereby controlling the playback of the media content. In addition, feedback regarding the quality of service of the streaming session may be provided to the network server, for example, via RTCP. Based on such information, the network server may control the media content stream to improve the quality of service, for example, by limiting flow or adjusting the compression codec. It should be noted that discussion of specific protocols herein is for illustrative purposes only, and the present invention is not limited to such protocols.

As can be seen, embodiments of the present invention enable a mobile device to playback and control media content stored on an associated personal media host device. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included, because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-useable instructions embodied thereon for causing a media server to perform a method comprising:
   receiving, from a mobile device, a request to review content information stored on a personal media host device located at the mobile-device customer's premises, wherein the request includes an identifier of the mobile device;
   using the media server to validate the mobile device is capable of engaging in packet-data communication based on a network address of the received identifier of the mobile device;
   identifying the personal media host device associated with the mobile device based upon the received identifier of the mobile device;
   determining whether the mobile device is authorized to access the content information stored on the identified personal media host device based on the identifier of the mobile device;
   based on a determination that the mobile device is authorized to access the content information, accessing the content information from the personal media host device for presentation at the mobile device;
   receiving, from the mobile device, a request for media content stored on the personal media host device corresponding to a selection of the presented content information;
   determining whether the mobile device is authorized to access the media content stored on the personal media host device;
   based on a determination that the mobile device is authorized to access the media content, accessing the media content from the personal media host device;
   accessing a remote database to review device capabilities of the mobile device based on the identifier thereof, wherein the device capabilities include hardware characteristics of the mobile device;
   communicating with the mobile device to dynamically access and retrieve device parameter information;
   dynamically conditioning the media content based on the device capabilities or the device parameter information; and
   initiating a streaming packet-data session from the media server to the mobile device over a wireless communications network using at least one base transceiver station.

2. The one or more media of claim 1, wherein the personal media host device comprises at least one of a personal computer, a set-top box, a legacy box, a digital video recorder, a personal video recorder, a hard disk recorder, a personal video station, a personal TV receiver, and a cable-ready television.

3. The one or more media of claim 1, wherein the mobile device comprises at least one of a mobile phone, a pager, and a personal data assistant.

4. The one or more media of claim 1, wherein the request for media content stored on the personal media host device includes at least one unique identifier for at least one of the mobile device and the personal media host device.

5. The one or more media of claim 1, wherein determining whether the mobile device is authorized to access the media content comprises communicating with an application, authentication, and accounting server.

6. The one or more media of claim 1, wherein the method further comprises:
   receiving a control command from the mobile device; and
   controlling the streaming session based on the control command.

7. The one or more media of claim 1, wherein the method further comprises:
   receiving quality of service information regarding the streaming session; and
   adapting the streaming session based on the quality of service information.

8. A system for providing mobile device playback and control of media content stored on a personal media host device, the system comprising:
   a mobile device;
   a personal media host device having media content stored thereon, the personal media host device being located at a customer's premises; and
   one or more network servers configured to perform the processes comprising:
   (a) receive, from the mobile device, a request for content information stored on the personal media host device, wherein the request includes an identifier of the mobile device,
   (b) identify the personal media host device associated with the mobile device based upon the received identifier of the mobile device,
   (c) determine whether the mobile device is authorized to access the content information stored on the personal media host device based on the identifier of the mobile device, and
   (d) based on a determination that the mobile device is authorized to access the content information, forward the content information from the personal media host device for presentation at the mobile device, wherein the content information is forwarded from the one or more network servers to the mobile device via a wireless communications network using at least one base transceiver station, (e) receive, from the mobile device, a request for media content stored on the personal media host device corresponding to a selection of the presented content information, (f) determine whether the mobile device is authorized to access media content from the personal media host device, (g) access the media content from the personal media host device based on a determination that the mobile device is authorized, and (h) access device parameter information for the mobile device by at least one of accessing a database storing the device parameter information or communicating with the mobile device to dynamically access the device parameter information.

9. The system of claim 8, wherein the one or more network servers comprise at least one authentication, authorization, and accounting server for determining whether the mobile device is authorized to access the media content stored on the personal media host device.

10. The system of claim 8, wherein the one or more network servers access device parameter information for the mobile device and condition the media content based on the device parameter information.

11. The system of claim 8, wherein the one or more network servers receive quality of service information regarding the streaming session, and adapt the streaming session based on the quality of service information.

12. A mobile device providing playback and control of media content from a personal media host device located at a customer's premises, the mobile device comprising:

one or more client applications stored on at least one storage device for communicating, to one or more network servers, the following requests:

(a) a request for content information stored on the personal media host device, wherein the request includes an identifier of the mobile device, wherein the personal media host device is identified as being associated with the mobile device based upon the received identifier of the mobile device, and based on a determination that the mobile device is authorized to access the content information utilizing the identifier of the mobile device, the one or more network servers forwarding the content information from the personal media host device for presentation at the mobile device via a wireless communications network using at least one base transceiver station; and (b) a request for media content stored on the personal media host device corresponding to a selection of the presented content information and for engaging in a streaming media session with the one or more network servers to receive the requested media content based on a determination that the mobile device is authorized to access the media content, wherein the request includes at least one unique identifier for at least one of the mobile device and the personal media host device, wherein the one or more network servers determine whether the mobile device is authorized to access the media content based on the at least one unique identifier and access device parameter information for the mobile device by at least one of accessing a database storing the device parameter information or communicating with the mobile device to dynamically access the device parameter information, wherein the one or more client applications communicate statistical information regarding quality of service information of the streaming session to the one or more network servers, wherein the statistical information includes a measure of packet loss, wherein the one or more network servers adapt the streaming session based on the quality of service information, and wherein adapting the streaming session includes adjusting a frames per second or a compression codec of the streaming session.

13. The mobile device of claim 12, wherein at least one of the one or more client applications provides control capability for the streaming session by communicating control commands to the one or more network servers, wherein the one or more network servers control the streaming session based on the control commands.

\* \* \* \* \*